April 20, 1943.  C. E. ROCKNE  2,316,890
WELDING ROD CONNECTOR
Filed July 4, 1942
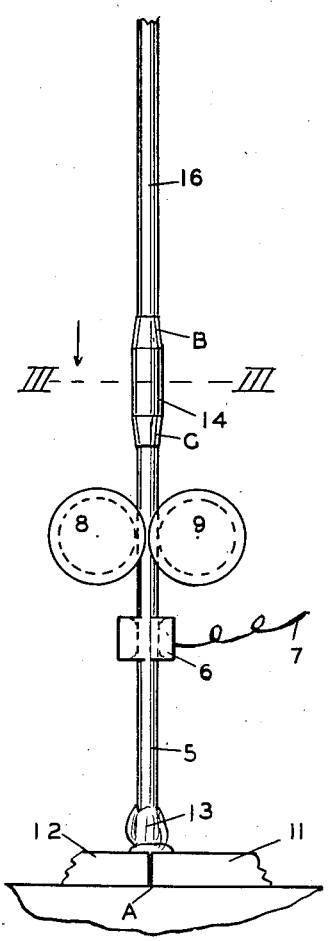
Fig. I.
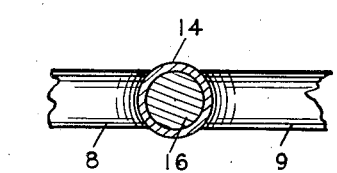
Fig. II.
Fig. III.
INVENTOR.
CLAIRE ELMER ROCKNE
BY Patented Apr. 20, 1943

2,316,890

UNITED STATES PATENT OFFICE 2,316,890

WELDING ROD CONNECTOR

Claire Elmer Rockne, Napa, Calif.

Application July 4, 1942, Serial No. 449,776

1 Claim. (Cl. 287—126)

This invention relates to improvements in welding rod connectors.

The principal object of this invention is to produce a connector for welding rods, particularly those rods used in automatic welding machines; however, this connector may be used with any type of welding rod without departing from the spirit of the invention.

A further object of this invention is to produce means whereby the welding machine may be run continuously in contra-distinction to the usual starting and stopping of the machine in order to renew the welding rod.

A further object is to provide means for saving a large amount of rod wastage.

A further object is to provide means whereby through the continuous welding, a better welding job is accomplished, as well as a better appearing weld.

A still further object is to prevent the missing of welding at certain spots, often occurring when the welding machine is stopped.

Other objects and advantages will be apparent during the course of the following description.

In the accompanying drawing forming a part of this specification and in which like numerals are employed to designate like parts throughout the same:

Fig. I is a diagrammatic sketch showing my connector in use on a welding rod as the same stands vertically in the welding machine and depositing metal at the joint.

Fig. II is an enlarged cross-sectional view of my device as the same appears when connected to two welding rods.

Fig. III is a fragmentary cross-sectional view shown on the line 3—3 of Fig. I, looking in the direction of the arrow.

In welding, automatic machines feed the welding rod downwardly through grippers and as the rod approaches the work, the arc between the work and the rod serves to melt or flow the melted rod into the joint to be welded.

These rods are of a special alloy, extremely expensive, and approximately sixteen (16) feet in length, and a rod lasts about four minutes.

Then the machine must be shut down and two minutes time consumed if the operator is fast before a new rod may be installed; also, one foot of rod is wasted each time a rod is changed.

Further, when a change occurs the weld becomes cool, and when striking a new arc with a new rod, a puddle or "gob" is left, and in some instances, the welder will not strike the stopping point, and therefore, in starting again may leave a break or space between the welding with the old rod and the welding with the new rod, resulting in a very poor weld and a very poor appearing job.

Applicant has perfected a connector for welding rods which will obviate all of these troubles. A connector made of the same material that is used in the welding rods, so that as the connector is fed into the arc, it will melt and become a part of the weld, making the weld a continuous weld having the same appearance and the same strength throughout.

In the accompanying drawing wherein for the purpose of illustration is shown a preferred embodiment of my invention, the numeral 5 designates a welding rod, which is held in jaws 6 of the welding machine and electrically connected by a wire 7 to a source of electric welding current.

This rod may be fed in any way, but here I have designated feed rollers 8 and 9. It is, of course, understood that this arrangement is merely diagrammatic.

Beneath the lower end of the rod are the plates 11 and 12 which are to be welded together, and this occurs when an arc 13 is formed between the lower end of the rod and the joint shown at A.

To the upper end of the rod 5 I attach one of my connectors 14, and into the top of the connector I place a second welding rod 16.

My connector consists of a tubular member having tapered ends B and C, and a division wall 17 formed midway within the bore of the tubular member.

It will here be noted that this division wall has flat surfaces formed at right angles to the bore, so that the flat ends of the rods will abut thereagainst.

The result of this construction is that when two rods are joined together, as shown in Fig. II, and the welding machine is in operation the rod 5 will be fed downwardly until the portion C of the connector passes between the feed rollers 8 and 9, and the feed rollers will separate slightly to permit the connectors to pass therebetween. The same will occur when the connector is fed through the jaws 6, and by the time the connector passes the jaws, the rod 5 will have become greatly heated and will expand in the connector, so that there is absolutely no danger of the rod slipping out of the connector. It will be here noted that the bore in the connector is a neat fit on the rods.

As the connector approaches the arc it will be apparent that being made of the same material, the connector will gradually be burned away and will become part of the weld. When the connector is completely burned away, then the new rod 16 will begin to be consumed.

It will thus be seen that I have produced a device which will accomplish all of the objects above set forth.

It is to be understood that the form of my invention herewith shown and described is to be taken as a preferred example of the same and that various changes relative to the material, size, shape and arrangement of parts may be resorted to without departing from the spirit of the invention or the scope of the subjoined claim.

Having thus described my invention, I claim:

In combination with a pair of welding rods, of a connector therefor formed of the same material as said welding rods, said connector comprising a tubular member having tapered ends and bores formed therein, said bores in axial alignment one with the other, whereby when welding rods are inserted therein said rods will be held in axial alignment, the bores of said connector being the same diameter as said welding rods, whereby the welding rod during use will maintain said rod and said connector in engagement through equal expansion, and a dividing wall between said bores against which said rods abut.

CLAIRE ELMER ROCKNE.